(No Model.) 2 Sheets—Sheet 1.

R. GALLOWAY.
STEERING DEVICE.

No. 584,500. Patented June 15, 1897.

Witnesses. Inventor.
Robert Galloway
Attorney.

(No Model.) 2 Sheets—Sheet 2.

R. GALLOWAY.
STEERING DEVICE.

No. 584,500. Patented June 15, 1897.

Witnesses.
M. N. Tuttle
J. A. Roda

Inventor.
Robert Galloway
by J Church & Church
his Attorney.

THE NORRIS PETERS CO., PHOTO-LITHO., WASHINGTON, D. C.

United States Patent Office.

ROBERT GALLOWAY, OF BUFFALO, NEW YORK.

STEERING DEVICE.

SPECIFICATION forming part of Letters Patent No. 584,500, dated June 15, 1897.

Application filed September 28, 1896. Serial No. 607,187. (No model.)

*To all whom it may concern:*

Be it known that I, ROBERT GALLOWAY, of Buffalo, in the county of Erie and State of New York, have invented certain new and useful Improvements in Steering Devices for Vehicles; and I do hereby declare the following to be a full, clear, and exact description of the same, reference being had to the accompanying drawings, forming a part of this specification, and to the reference-letters marked thereon.

My present invention has for its object to provide an improved steering device for vehicles, particularly adapted for road-engines, as traction-engines, road-rollers, and the like, whereby the movement of the steering-wheel is caused by steam-pressure and is readily controlled by the engineer or operator without entailing special exertion on his part and whereby also either the steam steering device can be used or the machine steered by hand without disconnecting the steam steering apparatus entirely; and it consists in certain improvements and arrangement of parts, hereinafter described, and the novel features pointed out in the claims at the end of this specification.

Figure 1:
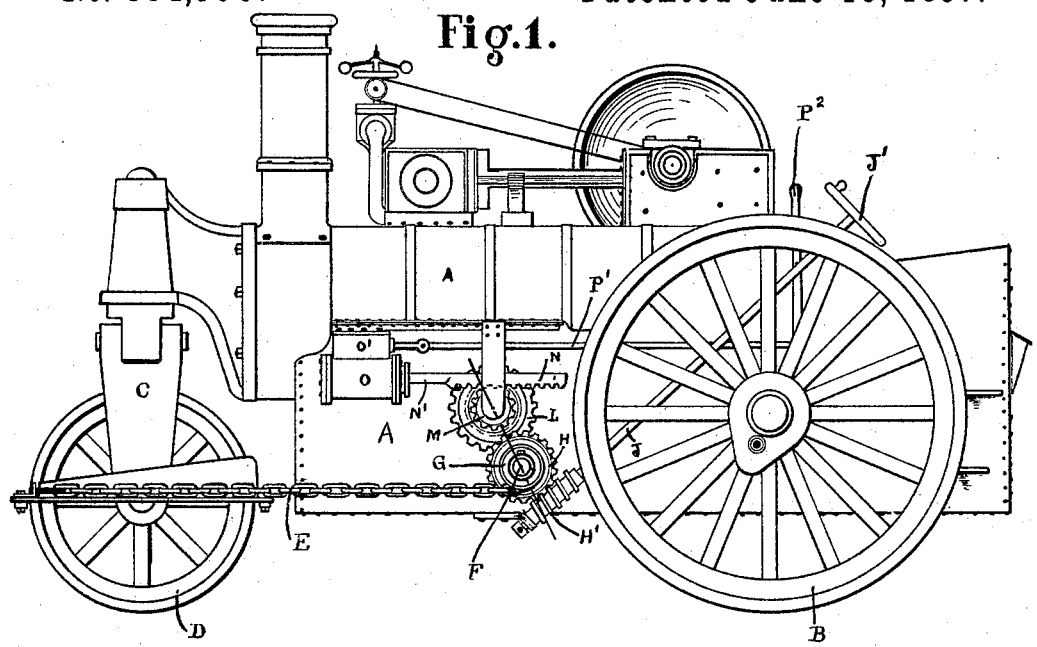
Figure 2:
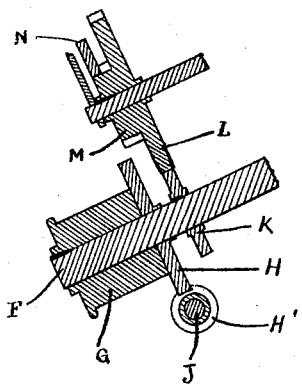
Figure 4:
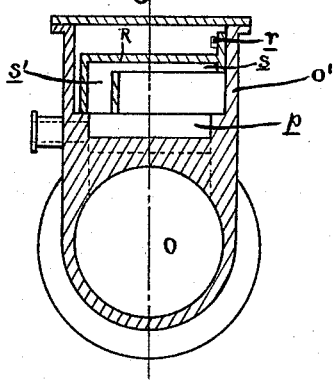
Figure 3:
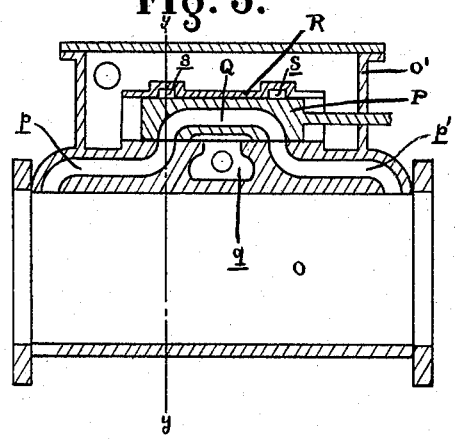
Figure 7:
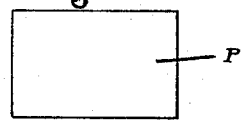
Figure 5:
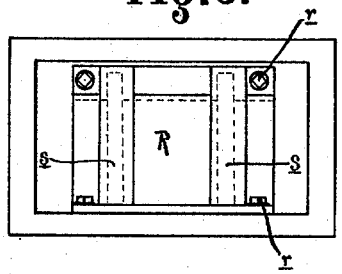
Figure 8:
Figure 6:
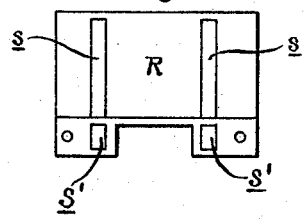
Figure 9:
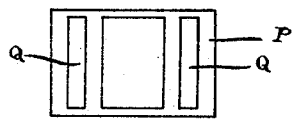

In the drawings, Figure 1 is a side elevation of a traction-engine provided with my improvements; Fig. 2, a sectional view on the line $x\,x$; Fig. 3, a sectional view of the steam-valve; Fig. 4, a vertical sectional view on the line $y\,y$ of Fig. 3; Fig. 5, a plan view of the steam-chest with the cover removed; Fig. 6, a bottom plan view of the valve-housing. Figs. 7, 8, and 9 are top, side, and bottom views, respectively, of the valve.

Similar reference-letters in the several figures indicate similar parts.

The main body or frame of a road-engine or other similar vehicle to which my invention is applied is indicated by the letter A, B indicating the rear or driving wheel, and C the bolster in which the front steering-wheel D is journaled, as usual. To this front bolster are connected chains E, one being located at each side of the machine and but one being shown in the accompanying drawings. These chains are connected, as usual, to the opposite ends of a through-shaft F, on which shaft are mounted chain drums or wheels G, the chains extending to opposite sides of said chain-wheels, so that by the rotation of the shaft the front bolster and steering-wheel will be turned, as usual.

Secured to the shaft F or preferably to one of the chain wheels or drums thereon is a worm-wheel H, with which engages a worm H' on a shaft J, extending toward the seat of the driver and having a hand-wheel J' thereon, as shown. Also secured to this shaft F or the worm-wheel thereon is a gear K, meshing with a corresponding gear L, arranged upon the side of the engine-frame and attached to or formed with a gear M, preferably of smaller diameter.

N indicates a reciprocating rack-bar connected to or formed upon a piston-rod N', having a piston-head operating in the steam-cylinder O.

O' indicates the steam-chest or valve-casing on the cylinder, and P the valve arranged therein, connected by a link P' with the hand-lever $P^2$, arranged in proximity to the engineer's seat or station. The valve P resembles somewhat an ordinary slide-valve, excepting that it is provided with a passage Q, extending through it and adapted, when communication between the valve-chest and the cylinder is closed, as in Fig. 3, to open communication between the ports $p$ and $p'$, leading to opposite ends of the cylinder.

It will be seen that when the valve is moved to the right or left steam will be admitted from the valve-chest and the ports $p$ and $p'$ to opposite ends of the cylinder and exhausted through the port $q$. The passage Q and the ports $p$ and $p'$ are so arranged relatively that the exhaust from one end of the cylinder will be to the opposite end before taking live steam from the valve-casing.

It is very desirable in a device of this kind that the steam-valve should be balanced so as to be easily manipulated, and I therefore arrange inside the valve-chest a housing R, adapted to be secured by bolts $r\,r$ to the side and bottom walls of the chest, said housing having passages $s\,s$ above the ports $p$ and $p'$ and also vertical passages $s'$ extending down to the ports, as in Fig. 4. The operation of this valve will be readily understood, and it will also be noted that the housing being attached at one side and the bottom of the steam-chest it can be readily adjusted to take up the wear of the parts. While this balanced valve is particularly adapted for this steering device, it is of course capable of being used in connection with any form of engine, and it is immaterial whether it is hand-manipulated or automatic in its action.

When the device is to be used for steering, the valve is moved to permit the passage of live steam into one end or the other of the cylinder, the gearing or other connections between the rack on the piston-rod and the shaft F tending to turn the shaft in one or the other direction, but this is prevented by the worm, which latter may then be manipulated by the hand-wheel to regulate the turning and steering of the vehicle. Thus the movement of the steering device is under the absolute control of the operator without requiring any considerable muscular exertion on his part, the worm-wheel following the movement of the worm, and this is true to whichever side of the piston the steam is admitted. The passage Q through the valve also enables the steering operation to be accomplished by the worm or screw alone when for any reason it is desirable, the air or steam in the cylinder passing from one side of the piston to the other, as will be understood. This arrangement enables me to retain the old style of hand-wheel steering, which is considered the most intelligent method, and also to employ steam to reduce the muscular effort when desired, as on heavy road-rollers.

The worm and worm-wheel act as a brake and prevent the operation of the steering device by the steam-cylinder, excepting as controlled by their movement, and while this is eminently desirable in this arrangement the manually-operated actuating device could be entirely auxiliary and not control, but be actuated by the power devices, though capable of causing the independent steering. When steam for steering is admitted first on one side and then on the other of the piston in this apparatus, the exhaust being admitted to the opposite side of the piston at each reversal will utilize the steam to a greater extent than if said exhaust were directly in the open air or the exhaust-pipe of the engine.

I have not deemed it necessary to herein describe or show in detail the various parts of a traction-engine or road-roller or other vehicle to which my invention is adapted, as this may be of any suitable construction and forms no part of my present invention.

Inasmuch as this invention could be well applied to boats or vehicles used on land or water, I prefer to refer to the frame carrying the wheel D as the "steering member," and it is therefore immaterial whether it be a wheel or rudder.

I claim as my invention—

1. In a steering device for vehicles, the combination with the movable steering member and power devices for operating it in opposite directions, of a worm-wheel connected therewith, and a worm under the control of the operator for regulating the movements of the power-actuating devices, substantially as described.

2. In a steering device, the combination with the movable steering member, a piston connected thereto, a cylinder and valve devices for governing the movement of the piston, of a worm-wheel and a worm under the control of the operator and controlling the movement of the steering member, substantially as described.

3. In a steering device, the combination with the movable steering member and power devices for actuating it in opposite directions, of auxiliary manually-operated devices connected with the steering member and controlling it when operated by the power devices and serving to actuate said member independently of the power devices, substantially as described.

4. In a steering device, the combination with the movable steering member, power devices for actuating it in opposite directions embodying a cylinder, a movable piston, valve devices for controlling the piston, and a passage connecting opposite sides of the piston, of manually-operated actuating devices connected with the movable steering member, substantially as described.

5. In a steering device, the combination with the movable steering member, power devices for actuating it in opposite directions embodying a cylinder, a movable piston, valve devices for controlling the piston, and a passage connecting opposite sides of the piston, of manually-operated actuating devices connected positively with the movable steering member and serving to control the latter when actuated by the power devices and also to cause the operation of the member independently thereof, substantially as described.

6. In a steering device, the combination with the movable steering member, power devices for actuating it in opposite directions embodying a cylinder, a movable piston and a manually-operated controlling-valve, and a passage for connecting opposite sides of the piston when the actuating fluid is cut off from the cylinder, of manually-operated actuating devices independent of the valve and connected with the steering member, substantially as described.

7. In a steering device, the combination with the movable steering member, power devices for actuating it in opposite directions embodying a cylinder, a movable piston and a valve having a passage for connecting opposite sides of the piston when the actuating fluid is cut off from the cylinder, of manually-operated actuating devices connected with the movable member and embodying a worm and worm-wheel, substantially as described.

8. In a steering device, the combination with the movable steering member, of the cylinder having the steam-chest and the ports $p$, $p'$, and $q$, the manually-operated valve for controlling said ports, having the passage Q and operated independently of the movement of the piston, the piston operating in the cylinder and connected to the steering member, and manually-operated actuating devices for operating the steering member, substantially as described.

9. In a steering device, the combination with the movable steering member, the cylinder, the piston and the valve controlling the latter, of the through-shaft, the chain-wheels thereon, the chains, the worm-wheel, the worm actuated by the operator, and connections between the through-shaft and the piston, substantially as described.

10. The combination with the cylinder having the ports $p$, $p'$ and $q$, the steam-chest, and the valve P, of the valve-housing R having the passages S, S' coöperating with the ports $p$, $p'$, and secured to the bottom and one side of the steam-chest by bolts $r$, substantially as described.

ROBERT GALLOWAY.

Witnesses:
BENJAMIN COWELL,
MARY KERR.